(12) United States Patent
Walker et al.

(10) Patent No.: US 7,641,547 B2
(45) Date of Patent: *__Jan. 5, 2010__

(54) METHOD AND APPARATUS FOR MOTIVATING PLAYERS TO RETURN TO A CASINO USING PREMIUMS

(75) Inventors: Jay S. Walker, Ridgefield, CT (US); James A. Jorasch, Stamford, CT (US); Thomas M. Sparico, New York, NY (US)

(73) Assignee: IGT, Reno, NV (US)

( * ) Notice: Subject to any disclaimer, the term of this patent is extended or adjusted under 35 U.S.C. 154(b) by 1119 days.

This patent is subject to a terminal disclaimer.

(21) Appl. No.: 10/875,144

(22) Filed: Jun. 23, 2004
(Under 37 CFR 1.47)

(65) Prior Publication Data

US 2007/0173317 A1    Jul. 26, 2007

Related U.S. Application Data (63) Continuation of application No. 10/282,090, filed on Oct. 28, 2002, now Pat. No. Re. 38,733.

(51) Int. Cl.
*A63F 9/24* (2006.01)
(52) U.S. Cl. .............. 463/25; 902/23; 705/17; 705/24
(58) Field of Classification Search ............. None
See application file for complete search history.

(56) References Cited

U.S. PATENT DOCUMENTS

| | | | |
|---|---|---|---|
| 4,689,742 A | 8/1987 | Troy et al. | 364/412 |
| 4,760,527 A * | 7/1988 | Sidley | 463/13 |
| 5,080,364 A | 1/1992 | Seidman | 273/138 A |
| 5,373,440 A | 12/1994 | Cohen et al. | 364/410 |
| 5,393,061 A | 2/1995 | Manship et al. | 273/143 R |
| 5,429,361 A | 7/1995 | Raven et al. | 273/138 A |
| 5,470,079 A | 11/1995 | LeStrange et al. | 273/138 A |
| 5,511,781 A | 4/1996 | Wood et al. | 273/85 CP |
| 5,559,312 A | 9/1996 | Lucero | 235/375 |
| 5,564,700 A | 10/1996 | Celona | 463/27 |
| 5,586,936 A | 12/1996 | Bennett et al. | 463/25 |
| 5,613,912 A | 3/1997 | Slater | 463/25 |
| 5,655,961 A | 8/1997 | Acres et al. | 463/27 |
| 5,766,075 A | 6/1998 | Cook et al. | 463/25 |

(Continued)

OTHER PUBLICATIONS

Yip, Pamela, "Lotto to give winners a choice", The Houston Chronicle, Oct. 28, 1996, Section: Business, Your Money, p. 1.

*Primary Examiner*—M. Sager
(74) *Attorney, Agent, or Firm*—K&L Gates LLP (57) ABSTRACT

A method of motivating players to return to a casino includes receiving a request to convert a predetermined value of casino currency to cash. Upon the receipt of the request, a premium value is calculated based at least in part on the predetermined value. Subsequently, the customer is provided an instrument having a total value equal to the predetermined value plus the premium value when the instrument is used at the casino. The instrument may comprise a check having a negotiable value equal to the predetermined value, and a second pay-line defining the total value with the premium to be provided if the check is cashed at the issuing casino.

4 Claims, 6 Drawing Sheets

U.S. PATENT DOCUMENTS

| | | | |
|---|---|---|---|
| 5,816,918 A * | 10/1998 | Kelly et al. | 463/16 |
| 5,967,896 A | 10/1999 | Jorasch et al. | 463/25 |
| 6,110,042 A | 8/2000 | Walker et al. | 463/25 |
| 6,193,608 B1 | 2/2001 | Walker et al. | 463/25 |
| 6,227,972 B1 | 5/2001 | Walker et al. | 463/25 |
| 6,319,125 B1 * | 11/2001 | Acres | 463/25 |

* cited by examiner

| PLAYER ID NUMBER | SOCIAL SECURITY NUMBER | NAME | ADDRESS | PHONE NUMBER | COMP INFO. | RATING | GAMBLING HISTORY | OTHER |
|---|---|---|---|---|---|---|---|---|
| 345 | | | | | | | | |
| 345 | | | | | | | | |
| 345 | | | | | | | | |

PLAYER DATABASE 240

METHOD AND APPARATUS FOR MOTIVATING PLAYERS TO RETURN TO A CASINO USING PREMIUMS

The present Application is a Continuation Application of commonly owned, U.S. patent application Ser. No. 10/282,090 entitled "METHOD AND APPARATUS FOR MOTIVATING PLAYERS TO RETURN TO A CASINO USING PREMIUMS", filed Oct. 28, 2002 now U.S. Pat. No. re 38,733; which is a Reissue Application of commonly owned U.S. patent application Ser. No. 08/775,598 entitled "METHOD AND APPARATUS FOR MOTIVATING PLAYERS TO RETURN TO A CASINO USING PREMIUMS", filed Dec. 31, 1996, and which issued as U.S. Pat. No. 6,193,608 on Feb. 27, 2001. The entirety of the above-referenced Application is incorporated by reference herein for all purposes.

BACKGROUND OF THE INVENTION

1. Field of the Invention

The present invention relates generally to gambling systems. More particularly, the present invention relates to a method and apparatus for motivating players to return to a casino using premiums.

2. Description of the Related Art

Casinos typically have their own private currency, such as casino chips, for players to use at table games where they play blackjack, craps, roulette, etc. At the beginning of a gambling session, a player exchanges public currency, such as cash, for chips. Table game operators give the players additional chips when they win. As a result, winning players, or those who do not use all their chips, have some left over at the conclusion of a gambling session. The players then submit the chips to the casino bank for conversion into cash.

Players generally prefer cash in lieu of casino chips because cash permits greater flexibility, for example when traveling between casinos, or just in general use. Cash is accepted at all casinos. Chips on the other hand can only be used at the casino that issued them. Casino chips are also bulkier than cash and are not easy to carry around. Furthermore, there is no significant barrier like a surcharge encouraging the player not to exchange chips for cash. Thus, players may move from cash to chips and back several times a day.

The slot machine player equivalent of cashing out chips is the exchange of credits for coins and/or paper currency. Slot machines almost exclusively use coins. When a player is finished playing, machine credits are typically converted to coins. Anything more than a handful of coins is simply too bulky to carry around. The typical player therefore brings his coins to a cashier, who exchanges the coins for bills. A slot player might perform this activity several times a day, such as immediately before leaving the casino for meals and at the end of the day.

A player who is cashing out chips or coins presents a risk to the casino. The risk is that the player will not return to gamble again at a subsequent session, either the same day or a following day. Despite this risk, casinos fail to provide any incentive at cash out for players to return and continue gambling, with the hope that, for example, the gambler who wins in one session will lose money in the subsequent session.

Some casinos employ a "player tracking card" system to award card holders with gifts, like free meals, for playing at the casino. At the beginning of a gambling session the player completes a form that provides the casino with information such as the player's address, telephone number, etc. The player information is stored electronically in the casino's computer along with a unique player identification. The casino then issues a player tracking card to the player. The player tracking card includes a magnetic strip encoded with the player's identification.

The computer is electronically connected by a network to card readers attached to, or incorporated as part of, the casino's slot machines. When a player plays the slot machines, he inserts the player tracking card into a card reader. The player's identification is then transmitted to the computer. The player then plays the slot machine in a conventional manner by inserting coins into the machine and starting the machine. When the player wins, the machine records the player's winnings as credits. The player can play the slot machine with stored credits while they last instead of inserting more coins. When the player decides to end the session with a particular slot machine, he pushes the machine's "cash out" button and the machine pays the player in coins. The player can then exchange the coins for dollar bills. When cashing out, the player retrieves the player tracking card from the reader. The casino uses the player tracking card to track the player's usage of the slot machines and to provide rewards to encourage player loyalty to the casino.

Using a network of player tracking card readers, the casino also uses the player tracking cards to track play at table games. For example, a table game operator inserts each player's tracking card into one of the readers at the beginning and end of play at a table. The conventional player tracking card system, however, fails to reward players for not cashing out and agreeing to return.

SUMMARY OF INVENTION

Accordingly, the present invention is directed to a method, apparatus, and product that substantially obviates one or more of the problems due to limitations, shortcomings, and disadvantages of the related art.

Systems consistent with the present invention reward customers whose cash out behavior evidences an intention to return to the casino at a later time.

To achieve these and other advantages, one aspect of the invention includes a method of motivating players to return to a casino, including the steps of: receiving a request to convert a predetermined value of casino currency to cash; calculating a premium value based at least in part on the predetermined value; and offering an instrument having a total value equal to the predetermined value plus the premium value when the instrument is redeemed, cashed, or otherwise used at the casino.

In accordance with another aspect of the invention, a system is provided for calculating awards for casino patrons. The system includes electronic memory, and a processing unit connected to the electronic memory. The processing unit in combination with the electronic memory is operative to receive a predetermined value indicative of casino currency, calculate a premium value based at least in part on the predetermined value, and output a total value equal to the predetermined value plus the premium value. The processing unit may further initiate the printing of an instrument having a cash value equal to the total value when it is used at the casino.

In one embodiment, the instrument offered to the player is a check having a negotiable face value, and a total, higher value including an award or premium which is available to the player if the check is cashed at the issuing casino. Thus a player would be motivated to leave his cash at the casino, having the security of a negotiable instrument plus the benefit of a premium if that negotiable instrument is presented at the casino, typically within a predetermined timeframe. The casino benefits from the use of the monies, and the likelihood of future business.

It is to be understood that both the foregoing general description and the following detailed description are exemplary and explanatory and are intended to provide further explanation of the invention as claimed.

BRIEF DESCRIPTION OF THE DRAWINGS

The accompanying drawings illustrate a preferred embodiment of the invention. The drawings are incorporated in and constitute a part of this specification.

In the drawings.

DETAILED DESCRIPTION

Systems consistent with the present invention avoid the shortcomings of prior art systems by providing a framework for dispensing premiums to those who indicate at the conclusion of a gambling session a willingness to leave their funds with the casino.

In one embodiment of the invention, upon a first visit to a casino a player provides information similar to that required to set up a bank account, including name, address, social security number, phone number, etc. The casino then stores this information in a player database along with a unique player identification for the player. The identification may be, for example, an alphanumeric identifier.

After the player's information is stored in the player database, the casino issues a player tracking card. The card may include the player's identification stored in, for example, a magnetic strip or bar code. The player's identification may be stored in an encrypted form to prevent those without the casino's special encryption/decryption code from decrypting the identification number from the card.

At the beginning of (or periodically during) a gambling session, the player may exchange cash for casino currency that is used almost exclusively to play the casino's games. Casino currency includes chips for table games and coins or electronic credits for electronic game machines. Other examples of casino currency include paper vouchers, plastic credit card-type vouchers, and other indicia used to represent currency at games operated by the casino. Electronic credits may be stored in the player database with an appropriate designation indicating that they belong to the player identified by the identification number on the player's card.

At the conclusion of a gambling session when the player seeks to exchange casino currency for cash, the casino offers the player an option of receiving a check or other printed instrument, such as a voucher or coupon, for a value corresponding to the amount of currency presented plus a calculated, optional premium. For example, if the player seeks to cash in $1000 in chips, the casino may offer the player a check or another type of printed instrument including a 5% premium, or an additional $50 for a total of $1050. The amount of the premium may be dependent on a number of factors such as the amount of casino currency presented, recent playing characteristics and results, and a stored rating for the player.

The receipt of the premium will typically be subject to limitations. For example, the casino may require the player to return to the casino to receive the premium. The casino may place time restrictions on receipt of the premium. In this way the player may receive a premium only after a determined date (e.g., the day after issuance of the check), and not later than another date (e.g., 60 days from issuance of the check), or both.

Since the check is a negotiable instrument, a player accepting the offered check may exchange it for cash elsewhere, for example, at a bank, at any time for the face value. However, in accordance with the present invention, the check further includes a premium available only through subsequent presentation at the casino. Thus, in accepting the casino's offer, the player may benefit from the premium while retaining the security of a negotiable instrument.

If the player accepts the casino's offer, the casino issues a check in the player's name. The casino also stores in a database, such as the player database, information corresponding to the checks issued to players. For example, the casino stores a base amount for each check (i.e., the amount of currency presented by the player), the amount of a premium, and the conditions for receipt of the premium. This stored information permits the casino to keep accurate records of the incentive program.

Figure 1:
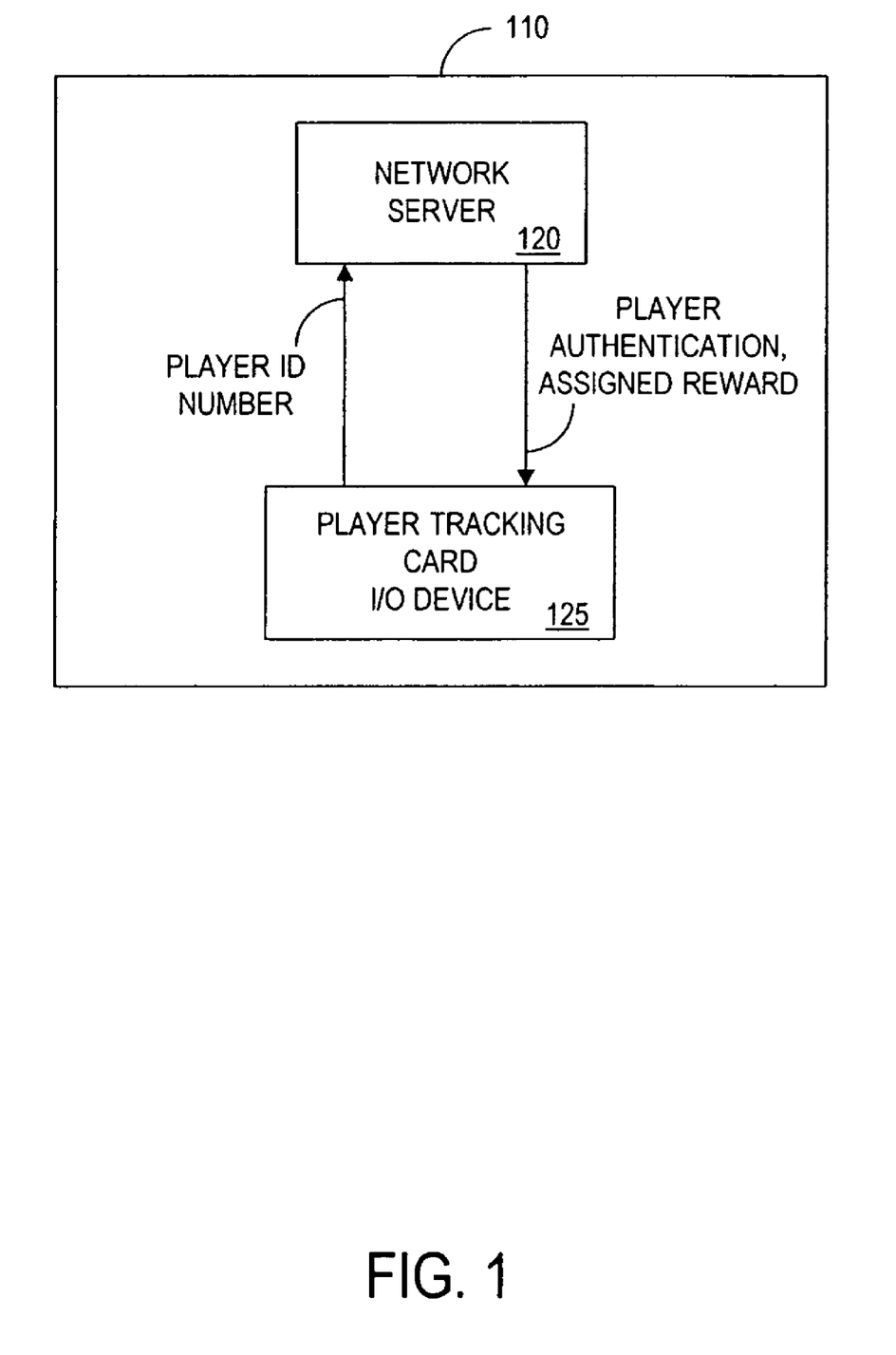
FIG. 1 is a block diagram of a system architecture consistent with the present invention that shows the data transmission between a player tracking card I/O device and a network server.

As shown in FIG. 1, a system 110 according to a preferred embodiment of the present invention includes a network server 120 and a player tracking card I/O device 125.

Network server 120 may be a conventional server computer such as an RS 6000 manufactured by IBM Corp. However, server 120 executes software to perform the preferred functions of this embodiment that are not considered conventional.

Player tracking card I/O device 125 is connected by an electronic network (not shown) to server 120. Commercially available player tracking card I/O devices include, for example, the Mastercom device available from Bally Manufacturing. (See, for example, U.S. Pat. No. 5,429,361 to Raven et al.) Such player tracking card I/O devices include a display and card reader. The display is used to display information concerning the use of the tracking device, for example, messages like "INSERT PLAYER TRACKING CARD NOW." The card reader reads information like the player's identification number from the card issued by the casino. A numeric keypad or other input unit may also be included as part of player tracking card I/O device 125 so information concerning the use of the tracking device can be input to the system.

Although FIG. 1 shows only one player tracking card I/O device, in practice the preferred embodiment envisions more player tracking card I/O devices connected to network server 120. Player tracking I/O devices are positioned, for example, in casino cages and in slot booths throughout the casino.

At the conclusion of a gambling session at the slot machines and/or table games, the player takes his casino currency, e.g., chips or coins, to a casino bank where a cashier offers the player a check with a premium instead of cash. If the player accepts this offer, he presents the cashier with a player tracking card that the cashier inserts into player tracking card I/O device 125. Device 125 then reads a player identification number from the card and transmits the number to network server 120.

Server 120 first confirms the player identification number against the player's information in the player database. Upon confirmation, server 120 reviews the player database for information on the player, such as his recent gambling history and rating, and calculates a premium to be awarded to the player based on the information from the player database. The premium may be a set percentage depending on the player's recent gambling history and/or rating, or it may be a default value or percentage if the player has, for example, no player identification number or an average rating.

Additionally, the calculation of the premium may be based on the amount of casino currency presented by the player. In this case, the cashier would use an input device, such as a keypad or terminal associated with device 125, to transmit the player's amount of casino currency to server 120.

Server 120 then transmits a message to the cashier's player tracking card I/O device 125 authenticating the player identification number from the inserted player tracking card as well as a value for a premium to be awarded to the player in exchange for accepting the check. The authentication message may include the player's name, address, and possibly other stored information from the player database. The cashier then issues the check to the player specifying multiple pay-lines. The primary pay-line represents the negotiable value of the check, i.e., the amount of chips and coins presented by the player. A plurality of secondary pay-lines indicate a secondary value including both the player's actual cash out value, i.e his chips and coins, plus the calculated premium. The check may also include specific conditions under which the player may obtain the premium, e.g., available only at the issuing casino if cashed during a specified period. The process of issuing checks may be performed by a terminal and printer attached to server 120.

Server Architecture

Figure 2:
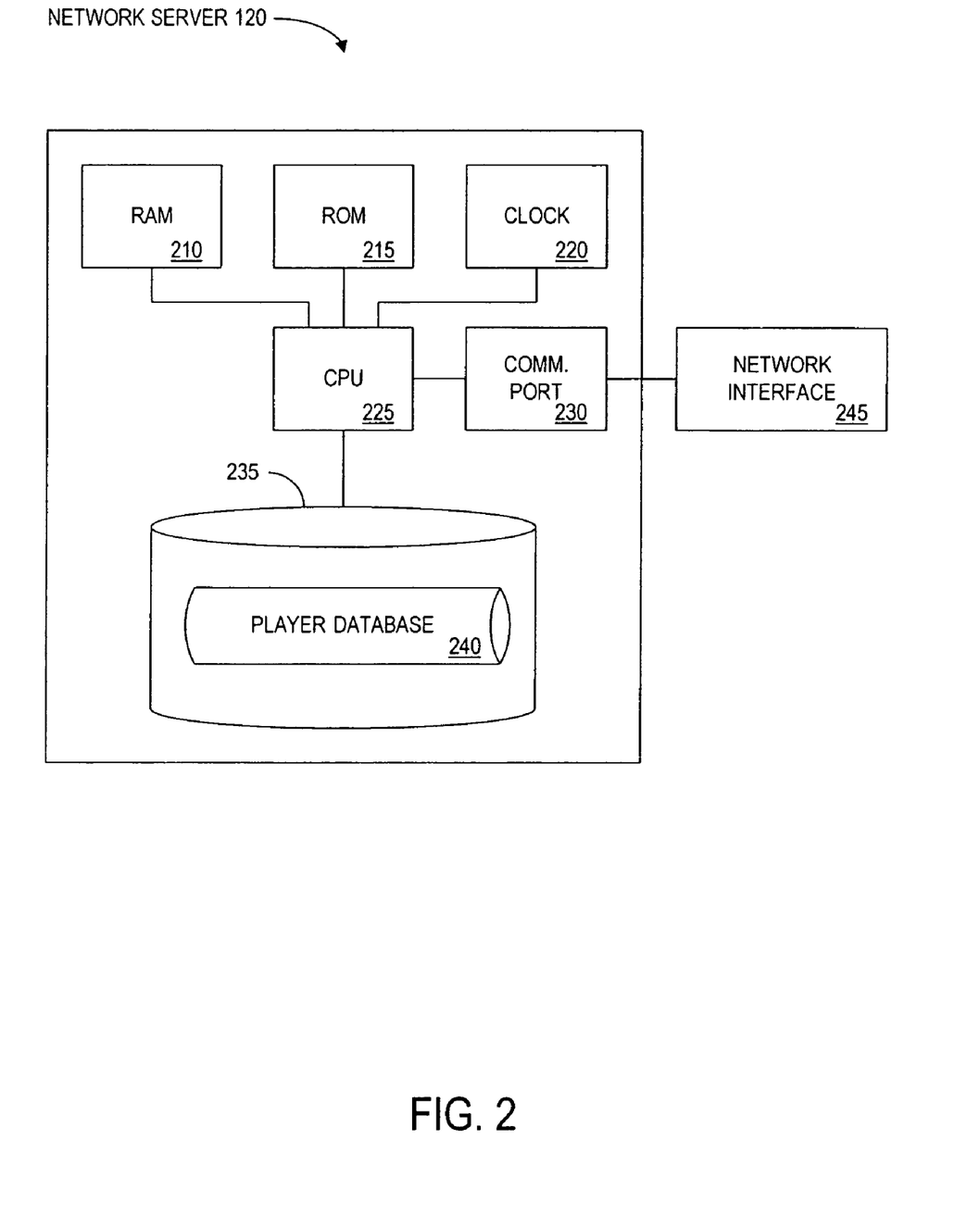
FIG. 2 is block diagram of a network server consistent with the present invention.

FIG. 2 is a block diagram showing a preferred architecture of network server 120. Like other conventional server computers, network server 120 includes certain standard, interconnected hardware components, such as Random Access Memory (RAM) 210, Read Only Memory (ROM) 215, clock 220, Central Processing Unit (CPU) 225, communications ports 230, and storage device 235. Communications port 230 connects network server 120 to network interface 245. Interface 245 connects network server 120 to a network of player tracking card devices.

Unlike conventional servers, network server 120 is programmed to perform the preferred functions of the present invention described herein. The program (not shown) is preferably stored in storage device 235 and executed by CPU 225.

Figure 3:
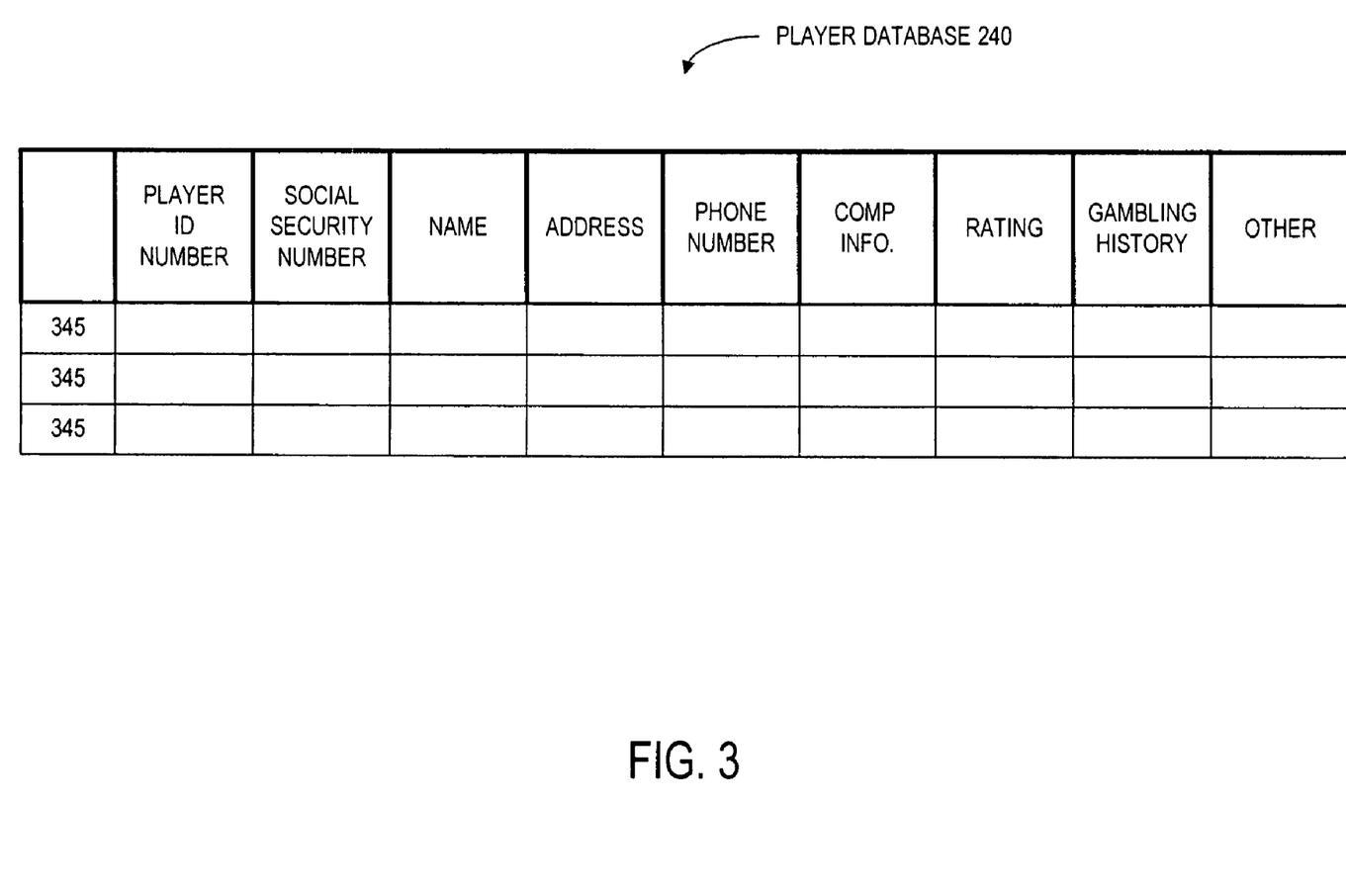
FIG. 3 is diagram showing the configuration of the network server's player database.

A player database 240 in network server's storage device 235 provides a repository of information on people who received casino player cards. FIG. 3 shows database 240 to include records of the following information on each player that set up an account with the casino operating the server: (1) a player identification number, (2) social security number, (3) name, (4) address, (5) phone number, (6) complimentary gift (i.e., "comp") information, (7) rating, (8) gambling history information, and (9) other.

The "comp" information for each player includes data indicating that the casino granted the player, for example, free drinks and meals at the casino, as rewards for playing at the casino. The casino also stores in the player database an assigned rating class for the player, for example, "below average," "average," "above average," or "outstanding." The rating scheme may be further divided by a ranking system that ranks players within each class so that there may be multiple ranks for the "outstanding" players. The casino changes a player's rating based on, for example, the amount of money that the player spends in the casino or other gambling history. The gambling history information includes available data on the player's gambling characteristics and results.

Each of the records 345 also includes a field for "OTHER" information such as additional comments on the player's relationship with the casino, information of previous premiums awarded to the player, or information on the player's use of those previously awarded premiums. All of this information may be used in calculating future premiums that the casino may award to the player.

Storage 235 may also include in player database 240, or in a separate database, information on all checks issued by the casino so the casino may reconcile its accounts. This would include information on the primary and any secondary pay-lines of all casino checks, the conditions associated with secondary paylines, and the amount of money that the casino paid to the player in exchange for the check, i.e., the amount of a primary or secondary payline.

Incentive Program Operation

Figure 4:
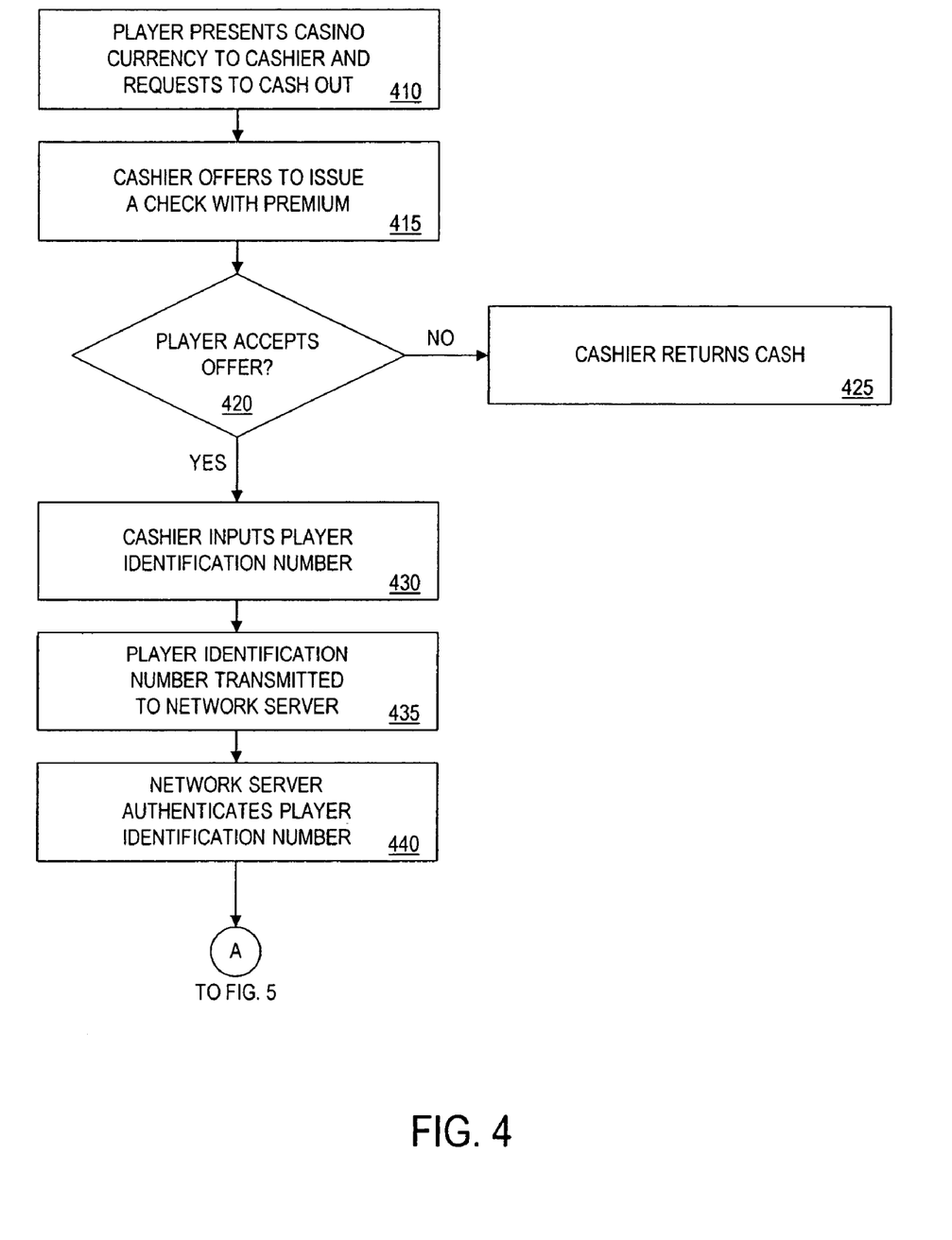
FIGS. 4 and 5 are a flowchart of the steps used to motivate players to return to the casino using premiums.
Figure 5:
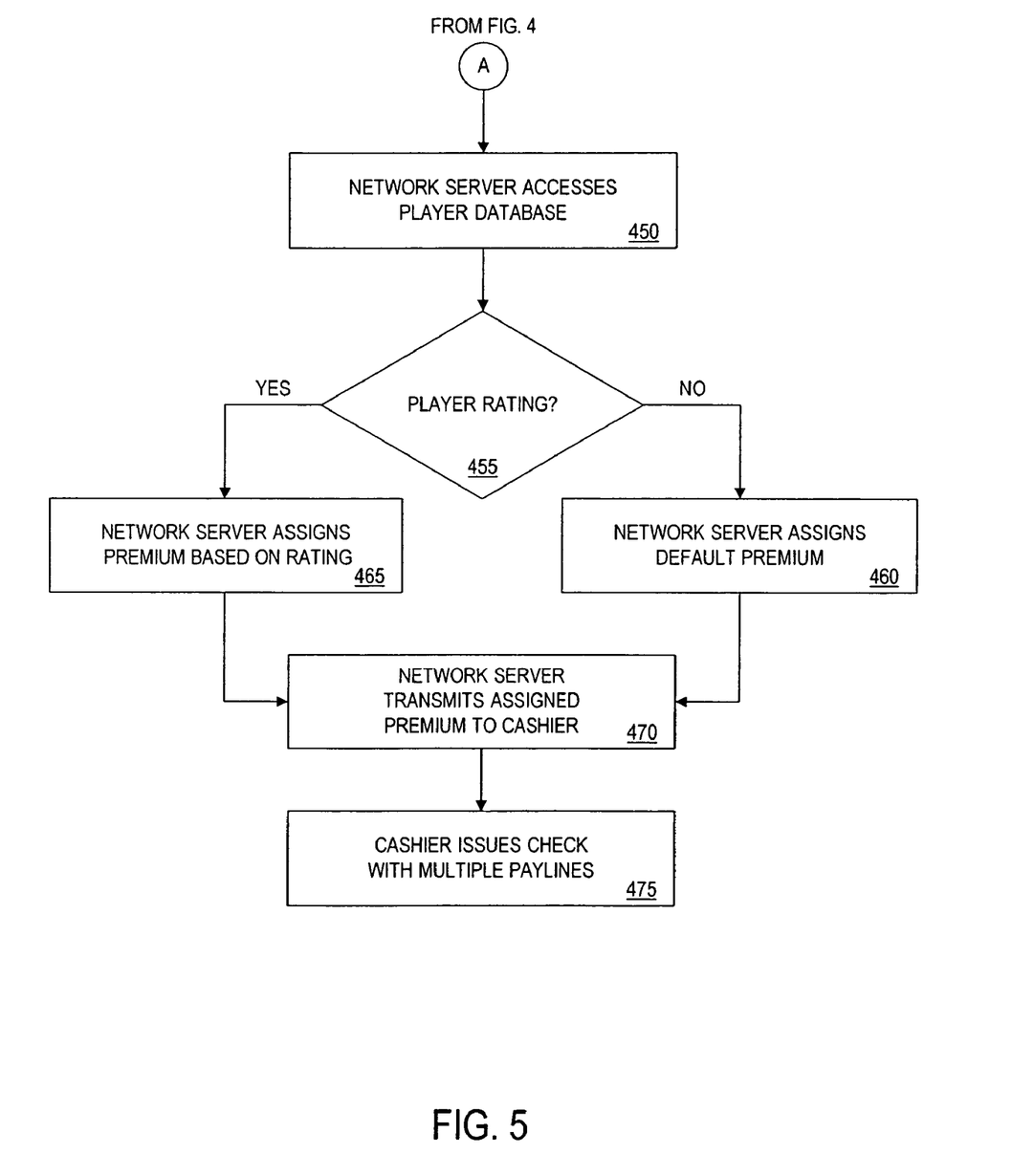

FIGS. 4 and 5 illustrate a process used to offer players incentives to return to a casino. According to this implementation, the player presents his casino currency to a casino cashier and requests that the cashier exchange the casino currency for cash (step 410). In response, the cashier inquires of the player to determine whether the player wishes to receive a check with an optional premium instead of cash. The premium may be received only if, for example, the check is cashed in the casino at a later date (step 415). If the player does not accept (step 420), the cashier simply pays the player in cash for the casino currency (step 425).

If the player accepts the offer (step 420), then the cashier inputs the player identification number using, for example, a player tracking card device connected by a network to network server 120 (step 430). Alternatively, the cashier may input the identification number using a terminal or other input device.

If the player does not have a player tracking card, the casino may issue one at this point in the cash-out process. The casino may also selectively use default numbers for players who do not wish to provide information necessary for the casino to issue a player tracking card. Each default number may correspond to a value reflecting the amount of currency presented by the player.

The identification number is then transmitted to network server 120 as part of a message indicating that the player has accepted the offer for a check with a premium for returning to the casino (step 435). The message may also include a value corresponding to the amount of currency presented by the player, which value the cashier may enter using a keypad of the player tracking card device, or other input device.

Network server 120 then authenticates the player identification number (step 440). If the player has an identification number, for example, on a tracking card, then this process step involves checking the identification number against the records in the player database. In the event the cashier enters a default player number, the authentication step may be eliminated.

Network server 120 then accesses a player database for information on the player corresponding to the identification number (step 450 of FIG. 5). If, however, network server 120 determines that the cashier entered a default identification number, network server 120 may bypass step 450 and continue with step 455 in which it is determined whether the player has a rating recorded in the player database. Network server 120 uses the player information and possibly other stored information to determine a premium to be offered to the player (steps 465).

If, however, there is no stored information for the player, either because the casino has not yet tracked the player's gambling activity or because the player does not have an identification number (and the cashier entered one of the default numbers), network server 120 assigns a default premium (step 460). In accordance with this embodiment, the default premium may be less than one based on stored information. Additionally, network server 120 may determine that a player should be granted a higher premium based on the stored information, or consider the amount of currency presented by the player in making this determination.

It will be understood that the purpose of the premium is to motivate the player to leave his cash, in some form, in the casino, thus encouraging his return at a later date. In the intervening period, the casino will have both the use of the monies, and the likelihood of future business. Thus, the value of the premium is selected to motivate the player's return, while minimizing the cost to the casino. While no exact algorithm is optimal for calculating the premium, the amount of the premium will be based on the value of the player as a customer, on his rating and any known gambling history. The greater the value of the player as a customer to the casino, the higher the premium likely to be offered. Similarly, a higher premium will likely be offered to motivate a player to return with what would otherwise be a large cash out value.

Network server 120 then transmits the assigned premium to the cashier (step 470). The premium may appear, for example, on a display of a tracking card device or a display attached to a terminal. The cashier then issues a check to the player, the check having a negotiable value equal to the cash out amount, and a casino value equal to the negotiable value plus the assigned premium (step 475). Alternatively, and in the case when the cashier inputs an amount of the player's currency being exchanged, network server 120 may transmit the necessary information to issue a check directly to an assigned printer for printing casino checks. The player may then surrender his casino currency in exchange for the check.

The system may be further automated, possibly eliminating the need for the cashier altogether, by employing an interactive scheme in which server 120 communicates directly with players regarding the premium offer. This may be accomplished by, for example, using kiosks throughout the casino, each kiosk including an I/O device, such as player tracking card I/O device 120, and a printer. According to this configuration, the player inputs his identification number by, for example, inserting his player tracking card into the a player tracking card I/O device. The number is transmitted through an electronic network to server 120. In return, server 120 sends messages for output (either video or audio) by the I/O device concerning the premium offer. For example, server 120 may send a message indicating the premium offer and seeking the player's acceptance of the offer. The player may accept by, for example, pressing an input key of the input unit of the player tracking card I/O device. If the player accepts, server 120 sends the necessary information to the attached printer to print the player's check.

The system may be further automated by eliminating the checks and storing in the player database information similar to that specified on the checks. In this configuration, the player database includes account information on the casino currency deposited by each player with the casino as well as information on the premium offered to the player for depositing the currency. Using a player tracking card, the player may retrieve deposited currency and the premium, assuming the conditions for receipt of the premium have been met.

Example Check

Figure 6:
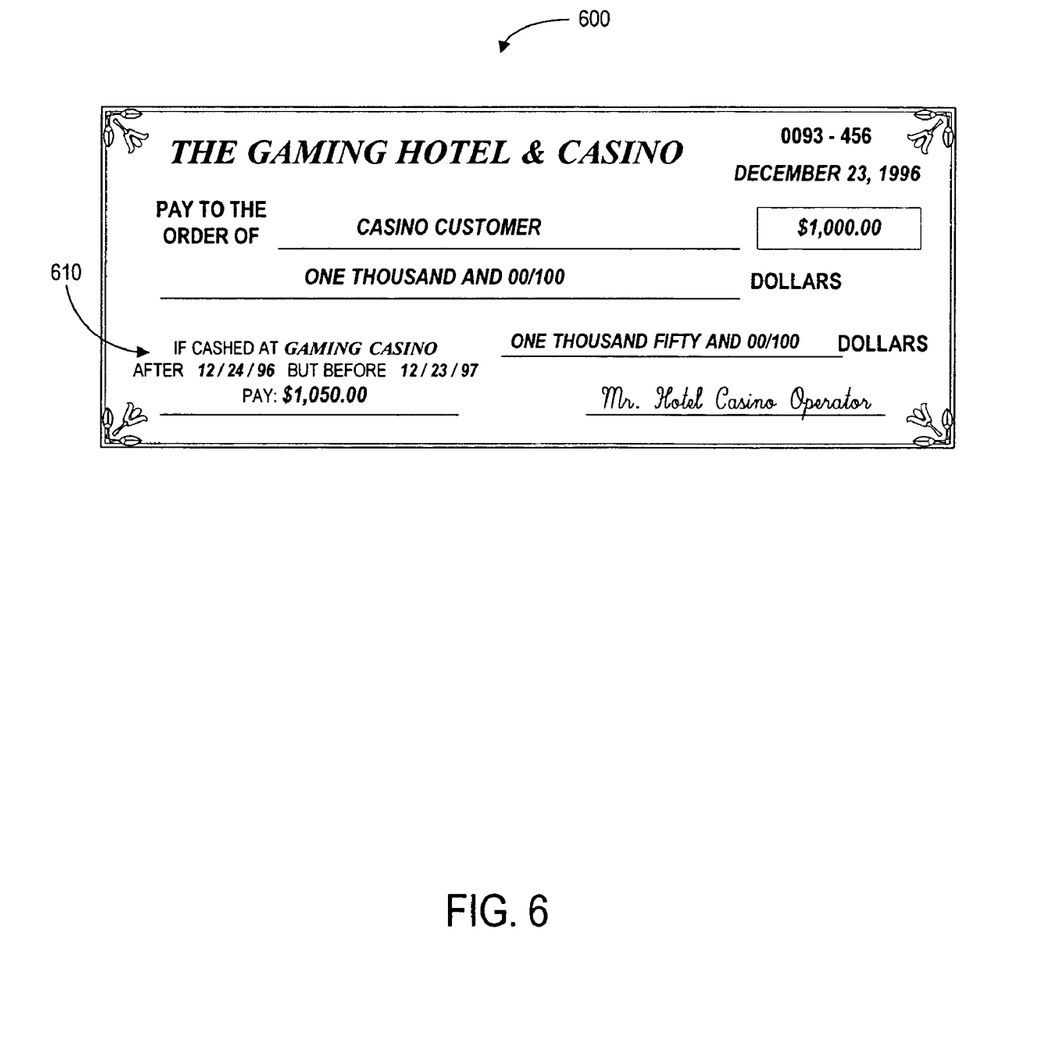
FIG. 6 is an exemplary check issued by the casino, including information on a premium.

FIG. 6 shows an example of a check 600 issued by a casino in accordance with the principles of this invention. As shown, check 600 is mostly conventional in that it includes the following information:

Payor: The Gaming Hotel & Casino (i.e., casino)
Check No. 0093-456
Issue date: Dec. 23, 1996
Payee: Casino Customer (i.e, the player)
Amount in numeric form: $1,000.00
Amount in written form: One Thousand and 00/100 Dollars.

The check also includes a multiple payline area 610. As illustrated, in area 610 the casino prints information corresponding to a premium that the payee may receive under specified conditions.

In the illustrated example, check 600 indicates that the casino will pay the payee a premium of $50.00 for cashing the check at the casino during the period Dec. 24, 1996 to Jan. 23, 1997. Thus, under the specified conditions the casino will reward the player with a $50 premium for returning to the casino to cash the check.

Check 600 is the same as a standard check, in that it may be negotiated in any standard manner. The casino does not require that that it be cashed at the casino. It does, however, make the premium available only when the check is cashed at the casino.

Additionally, the conditions of a premium need not be limited to a specified period, for example, one month from issue date. Furthermore, the casino may offer the premium regardless of where the check is cashed, provided other specified conditions are met. For example, the casino may pay premiums to players who elect not to cash their checks for thirty days from the issue date. In this way the casino may benefit financially from the player's delay in exchanging the check for cash.

The casino may also select from a variety of types of premiums. For example, the player's premium may be higher or lower based on information in the player's history on file with the casino. The premium could be a fixed bonus amount (e.g., $5 for every $100 in the primary payline), a percentage based on the value of the player to the casino, a percentage added for each day (or hour) that the check is not cashed, one entry in a lottery for each $100 in the primary payline, or one free handle pull at a slot machine for each $100 in the primary payline. Additionally, the player can use the premium sooner than the a specified time limitation for limited purposes such as to pay a hotel bill or pay off an outstanding marker.

The choice of an appropriate premium is up to the casino, or the casino may offer a selection of possible premiums from which the player may select. The casino's premium arsenal is practically unlimited. It includes offering room credits and services at the casino's hotel, such as an extra night for free past the scheduled end of their stay, or a free meal. It may also include offering products, such as appliances, and/or other services, such as travel, as awards for non-cashout behavior.

Further in accordance with the present invention, the described alternative to cashing out winnings may be provided directly at a slot machine. Modern slot machines are typically equipped to identify players, receive player input (for example from a keypad), and provide visual information back to the player. Further, player wins are typically denoted as stored electronic credits, convertible to coins at the machine when a player presses a "cash out" button. In this embodiment of the invention, when the player chooses to cash out his electronic credits, the electronic display on the slot machine is used as the means of offering the player an alternative to such cashing out. Should the player choose to accept the alternative offer, i.e. choose to leave his credits on account with the addition of the premium, he can select to have the total value of his electronic credits plus the premium stored on the network server in a manner accessible by his player identification. In fact, a "store electronic credits" button may be provided to enable this function. The player may then access those total funds at a later time through presentation of his tracking card/player identification in an appropriate manner.

CONCLUSION

There has thus been provided a method and apparatus for motivating casino patrons to leave their monies with a casino for future use, in instances where they might otherwise cash out. The practice of the invention not only provides the casino with the benefits of a monetary float, but the strong likelihood of repeat business by the customer. In the embodiments described, the benefits of the invention are realized with minimal risk and inconvenience to the customer, and also at minimal cost to the casino. The result will be a substantial increase in both customer satisfaction and repeat business for the casino.

It will be apparent to those skilled in the art that numerous modifications and improvements can be made to the present invention without departing from the spirit and scope thereof.

What is claimed is:

1. A gaming device, comprising:
   electronic memory; and
   a processing unit connected to said electronic memory;
   said processing unit in combination with said electronic memory operative to store electronic credits,
      receive a request to convert a predetermined value of stored electronic credits to coins,
      calculate a premium value based at least in part on said predetermined value,
      calculate a total value equal to said predetermined value plus said premium value; and
      output a ticket redeemable for the predetermined value before a first time and the premium value after the first time.

2. The gaming device of claim 1 wherein said processing unit in combination with said electronic memory are further operative to initiate the display of a message offering to store said total value in an electronic account until at least the first time in lieu of converting said predetermined value to coins prior to the first time.

3. The gaming device of claim 2 and further including means for displaying said message to a human player.

4. The gaming device of claim 2 and further comprising means for receiving a player identification and using said player identification in establishing said electronic account.

* * * * *

UNITED STATES PATENT AND TRADEMARK OFFICE
CERTIFICATE OF CORRECTION

| | |
|---|---|
| PATENT NO. | : 7,641,547 B2 |
| APPLICATION NO. | : 10/875144 |
| DATED | : January 5, 2010 |
| INVENTOR(S) | : Walker et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1504 days.

Signed and Sealed this

Sixteenth Day of November, 2010

David J. Kappos
*Director of the United States Patent and Trademark Office*